United States Patent
Yu

(10) Patent No.: US 9,687,870 B2
(45) Date of Patent: Jun. 27, 2017

(54) SPRINKLING DEVICE

(71) Applicants: AQUALEAN MANUFACTURING ASSOCIATES CO., LTD., Taipei (TW); VERDUREWIN ENTERPRISE CO., LTD., Changhua, Changhua Hsien (TW)

(72) Inventor: Pin-Hsien Yu, Taipei (TW)

(73) Assignees: AQUALEAN MANUFACTURING ASSOCIATES CO., LTD., Taipei (TW); VERDUREWIN ENTERPRISE CO., LTD., Changhua, Changhua Hsien (TW)

( * ) Notice: Subject to any disclaimer, the term of this patent is extended or adjusted under 35 U.S.C. 154(b) by 72 days.

(21) Appl. No.: 14/871,143

(22) Filed: Sep. 30, 2015

(65) Prior Publication Data

US 2017/0087581 A1    Mar. 30, 2017

(51) Int. Cl.
| | |
|---|---|
| B05B 7/02 | (2006.01) |
| B05B 15/08 | (2006.01) |
| B05B 1/16 | (2006.01) |
| B05B 1/18 | (2006.01) |
| B05B 1/02 | (2006.01) |
| B05B 15/06 | (2006.01) |
| B05B 9/01 | (2006.01) |
| B05B 1/30 | (2006.01) |
| F16L 27/08 | (2006.01) |

(52) U.S. Cl.
CPC .............. *B05B 15/08* (2013.01); *B05B 1/02* (2013.01); *B05B 1/16* (2013.01); *B05B 1/1645* (2013.01); *B05B 1/1681* (2013.01); *B05B 1/185* (2013.01); *B05B 1/302* (2013.01); *B05B 9/01* (2013.01); *B05B 15/061* (2013.01); *B05B 15/063* (2013.01); *B05B 15/066* (2013.01); *F16L 27/0849* (2013.01)

(58) Field of Classification Search
CPC ......... B05B 15/08; B05B 1/02; B05B 1/1681; B05B 1/185; B05B 15/061; B05B 15/063; B05B 1/16; B05B 1/1645; B05B 9/01; B05B 1/302; B05B 15/066; F16L 27/0849
USPC ........ 239/525, 526, 273–280, 390–394, 397, 239/437, 537, 538, 587.1, 587.5; 285/184, 272, 276
See application file for complete search history.

(56) References Cited

U.S. PATENT DOCUMENTS

| | | | | |
|---|---|---|---|---|
| 1,125,642 | A * | 1/1915 | Blanchard .............. | A62C 31/03 239/587.5 |
| 4,266,730 | A * | 5/1981 | Grohe ................... | B05B 15/066 239/587.5 |
| 5,160,093 | A * | 11/1992 | Battaglia ............... | B05B 1/1609 239/525 |

(Continued)

*Primary Examiner* — Steven J Ganey
(74) *Attorney, Agent, or Firm* — Egbert Law Offices, PLLC

(57) ABSTRACT

A sprinkling device includes a grip, a rotary seat sealingly mounted onto the grip and a sprinkling head sealingly and rotatably mounted onto the rotary seat. The sprinkling device is used as a spray gun when an axis of sprinkling head co-axially corresponds to that of the rotary seat or the axis of sprinkling head is parallel to that of the rotary seat. The sprinkling device is used as a sprinkler when the axes of the sprinkling head and the rotary seat form an angle, wherein the grip is used as a platform and the sprinkling head upwardly sprays water.

6 Claims, 10 Drawing Sheets

(56) References Cited

U.S. PATENT DOCUMENTS

| | | | | |
|---|---|---|---|---|
| 6,257,505 B1* | 7/2001 | Wang | ............... | B05B 15/066 |
| | | | | 239/526 |
| 6,508,415 B2* | 1/2003 | Wang | ............... | B05B 15/066 |
| | | | | 239/526 |
| 6,554,209 B2* | 4/2003 | Djordjevic | ............ | B05B 9/01 |
| | | | | 239/276 |

* cited by examiner

SPRINKLING DEVICE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to a sprinkling device, and more particularly to a multi-functional sprinkling device that can be operated as a spray gun as well as a sprinkler.

2. Description of Related Art Including Information Disclosed Under 37 CFR 1.97 and 37 CFR 1.98.

Conventional sprinkling products in accordance with the prior art includes the types of hand-held sprinkling gun, upright sprinkler, placing sprinkler and hanging sprinkler. Usually, the placing sprinkler is put or selectively secured on the ground for easily changing the position thereof. However, the conventional sprinkling products usually provide only one function, such as a spray gun or a sprinkler. As a result, the conventional products cannot satisfy different operating requirements.

Furthermore, the conventional spay gun is inconvenient for continually irrigating the same area. The switch of the conventional spray gun usually has two types including press-type and trigger-type. Consequently, the operator needs to continually apply force on the switch and hold the grip of the conventional spray gun when being used to irrigate the same area.

The present invention has arisen to mitigate and/or obviate the disadvantages of the conventional sprinkling products.

BRIEF SUMMARY OF THE INVENTION

The main objective of the present invention is to provide an improved sprinkling device that can be operated as a spray gun as well as a sprinkler.

To achieve the objective, the sprinkling device in accordance with the present invention comprises a grip, a rotary seat sealingly mounted onto the grip, and a sprinkling head sealingly and rotatably mounted onto the rotary seat. The rotary seat has a first inclined face formed thereon, wherein the first inclined face is elliptical. The first inclined face and a longitudinal section of the grip form a first angle. The sprinkling head is formed with a second inclined face, wherein the second inclined face and an axis of the sprinkling head form a second angle, the second inclined face is elliptical and the second angle is complementary relative to the first angle. The ratio of the major axis and the minor axis of the first inclined face is equal to that of the major axis and the minor axis of the second inclined face such that the first inclined face and the second inclined face are congruent to each other.

The sprinkling device is used as a spray gun when an axis of sprinkling head co-axially corresponds to that of the rotary seat or the axis of sprinkling head is parallel to that of the rotary seat, and the rotary seat and the sprinkling head form an angle. The sprinkling device is used as a sprinkler when the sprinkling head is rotated relative to the rotary seat. Consequently, the grip and the rotary seat support the sprinkling head on a supporting face and the sprinkling head is upwardly extended for being operated as a sprinkler and continually irrigated a specific area.

Further benefits and advantages of the present invention will become apparent after a careful reading of the detailed description with appropriate reference to the accompanying drawings.

DETAILED DESCRIPTION OF THE INVENTION

Figure 1:
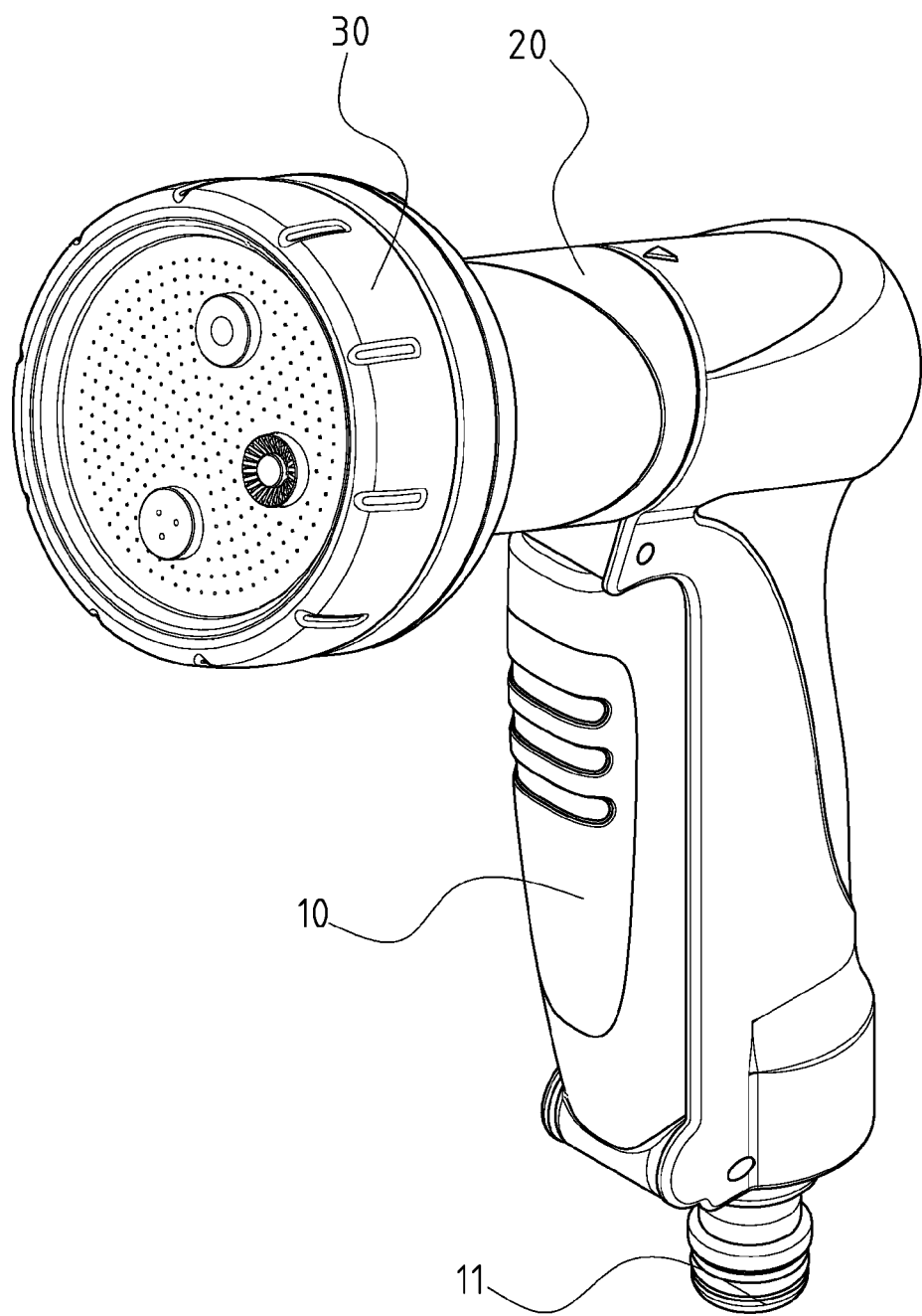
FIG. 1 is a first perspective view of a sprinkling device in accordance with the present invention when being used as a spray gun.

Referring to the drawings and initially to FIGS. 1-4, a sprinkling device in accordance with the present invention comprises a grip 10, a rotary seat 20 sealingly mounted onto the grip 10 and a sprinkling head 30 sealingly and rotatably mounted onto the rotary seat 20. The sprinkling device in accordance with the present invention is used as a spray gun when an axis of sprinkling head 30 co-axially corresponds to that of the rotary seat 20 or the axis of sprinkling head 30 is parallel to that of the rotary seat 20. The sprinkling device in accordance with the present invention is used as a sprinkler when the axes of the sprinkling head 30 and the rotary seat 20 form an angle, wherein the grip 10 is used as a platform and the sprinkling head 30 upwardly sprays water.

Figure 5:
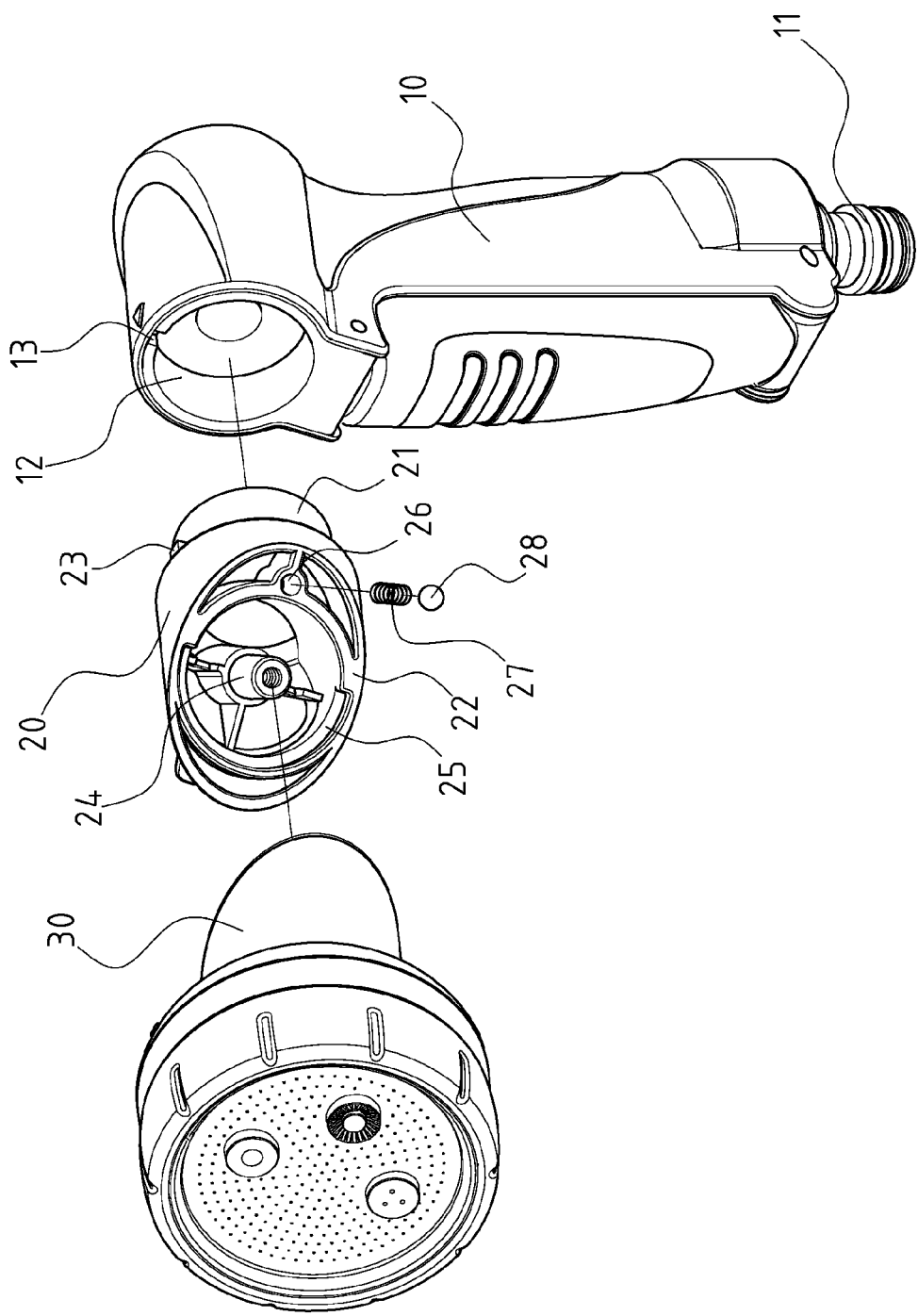
FIG. 5 is an exploded perspective view of the sprinkling device in accordance with the present invention.
Figure 6:
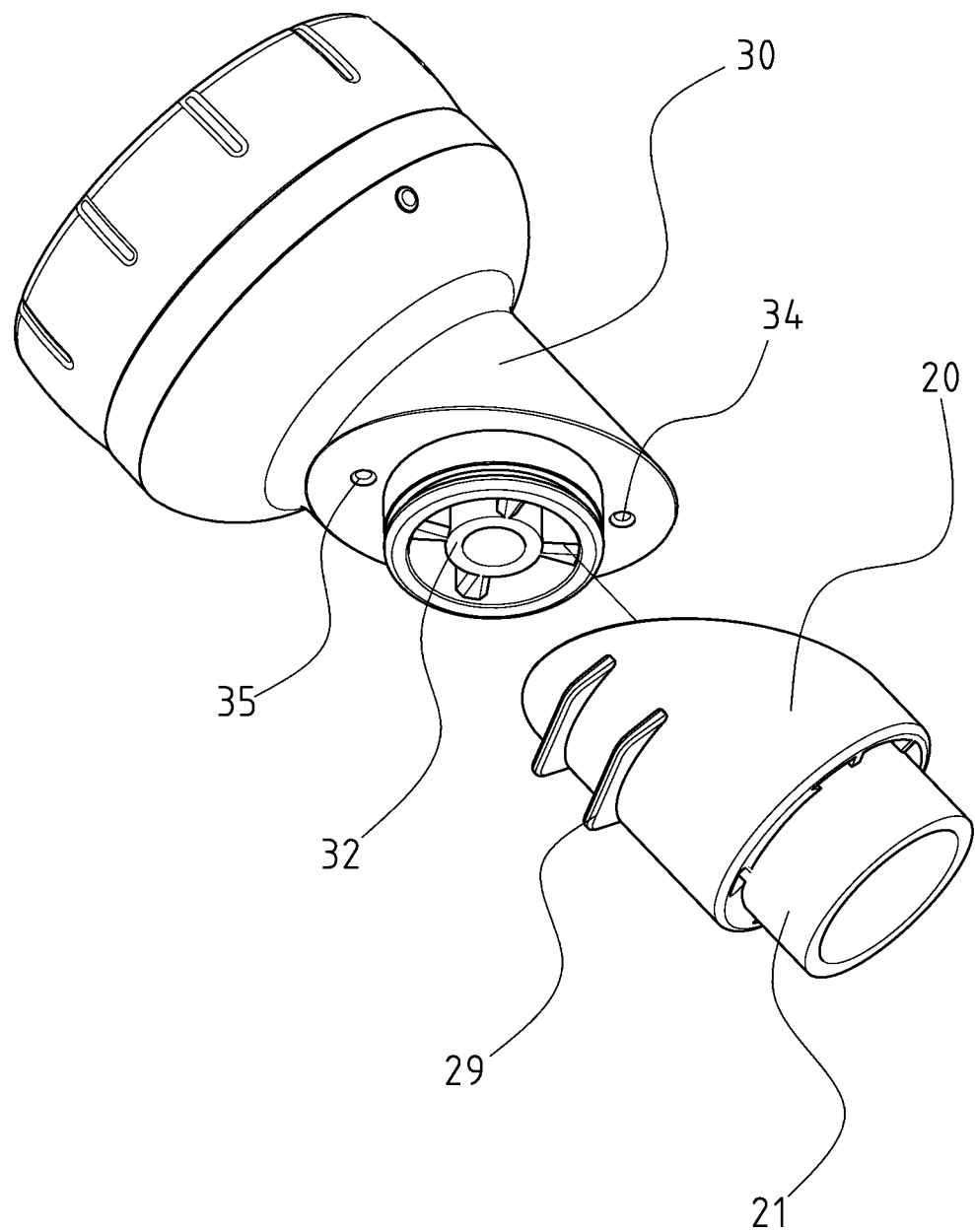
FIG. 6 is a partially exploded perspective view of the sprinkling device in accordance with the present invention.
Figure 7:
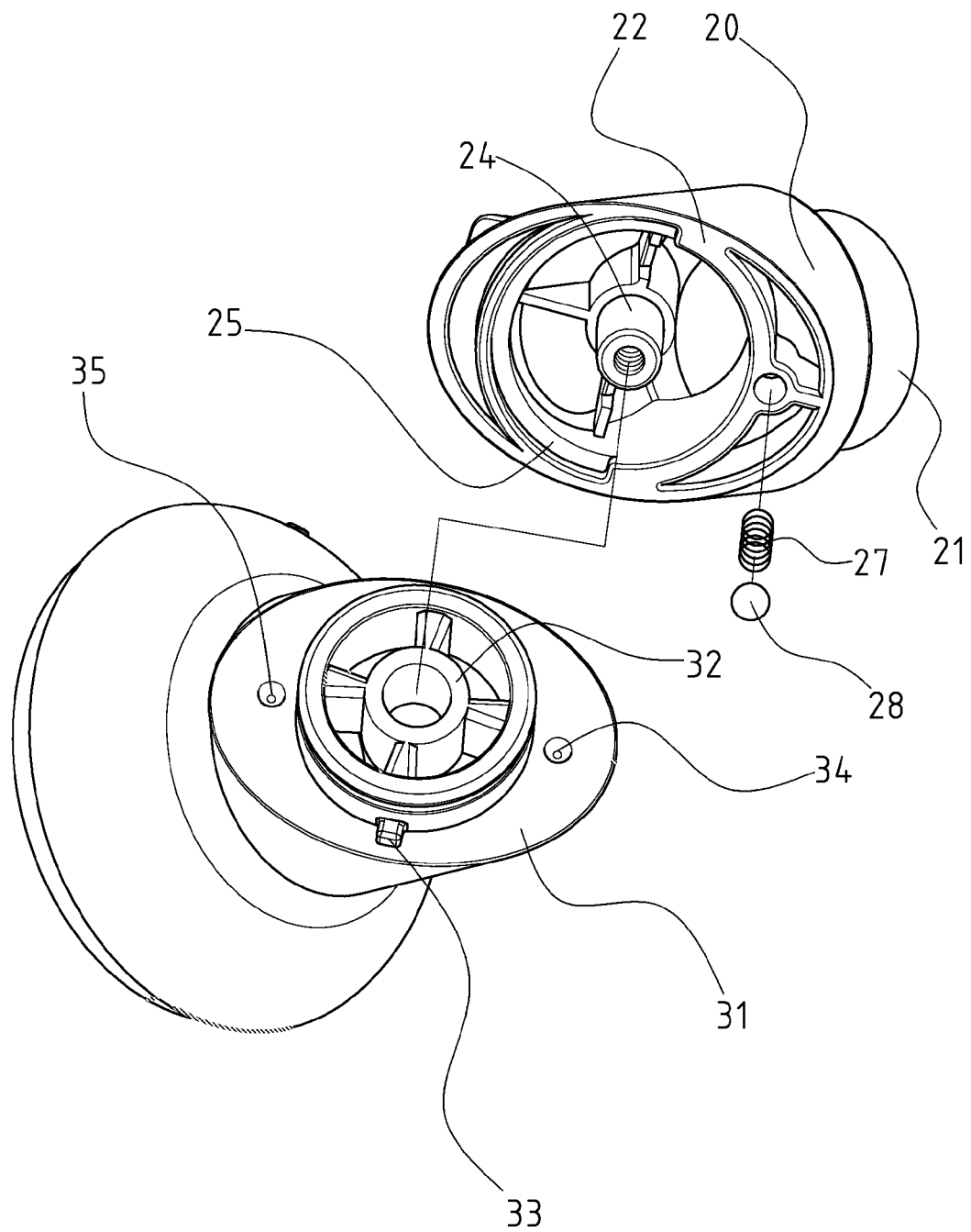
FIG. 7 is another partially exploded perspective view of the sprinkling device in accordance with the present invention.

With reference to FIGS. 5, 6 and 7, the grip 10 includes a connecting port 11 formed on a bottom thereof, wherein the connecting port 11 is adapted to be connected to a hose (not shown). A cavity 12 is defined in a top portion of the grip 10 and an indentation 13 is defined in an inner periphery of the cavity 12.

The rotary seat 20 includes an insertion 21 formed on a first end thereof and inserted into the cavity 12 in the grip 10. In the preferred embodiment of the present invention, the rotary seat 20 can be integrally formed with the grip 10. The rotary seat 20 has a first inclined face 22 formed on a second end thereof, wherein the first inclined face 22 is elliptical. The first inclined face 22 and a longitudinal section of the grip 10 form a first angle. In the preferred embodiment of the present invention, the first angle is 45 degrees. A guider 23 is radially formed on the insertion 21 and received in the indentation 13 for ensuring the connecting angle between the grip 10 and the rotary seat 20. The rotary seat 20 includes a pivot 24 extending from the first inclined face 22, a curved groove 25 and a bore 26 are respectively defined in the first inclined face 22, wherein the curved groove 25 is semi-circular. A spring 27 and a steel ball 28 are sequentially mounted into the bore 26. One side of the rotary seat 20 is formed with at least one support structure 29 to preventing the grip 10 and the rotary seat 20 from being rotated relative to a supporting face (ground) 40. In the preferred embodiment of the present invention, the support structure is multiple ribs extending from the grip 10 or a plane adapted to abut the supporting face 40.

Figure 9:
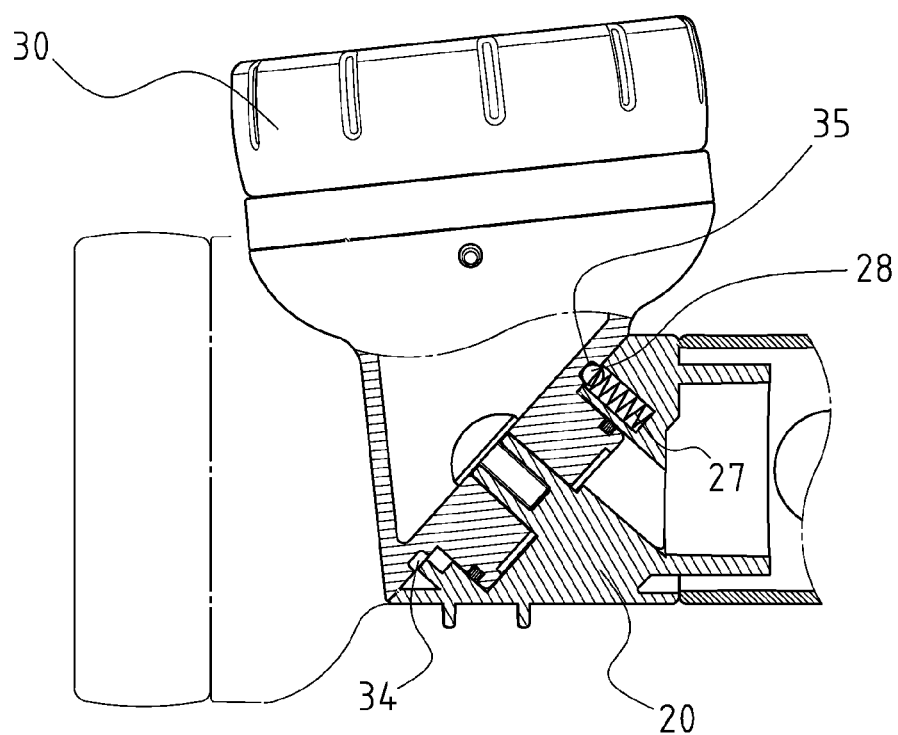
FIG. 9 is an operational view of the sprinkling device in accordance with the present invention.
Figure 10:
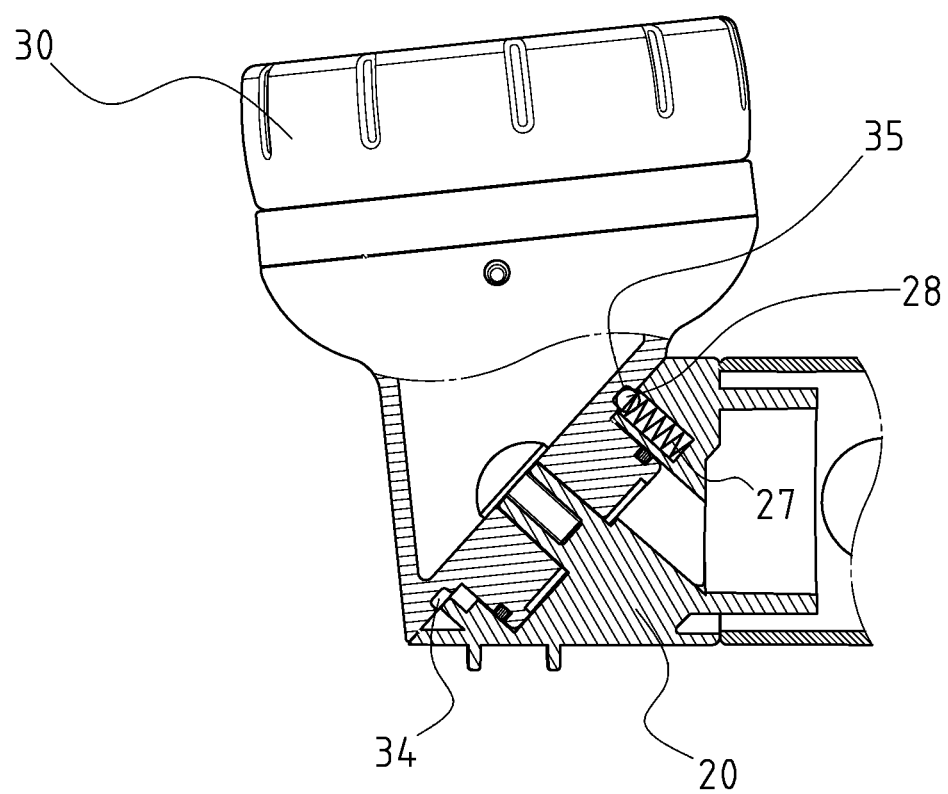
FIG. 10 is a schematic view of the sprinkling device in accordance with the present invention when being used as a sprinkler.
Figure 11:
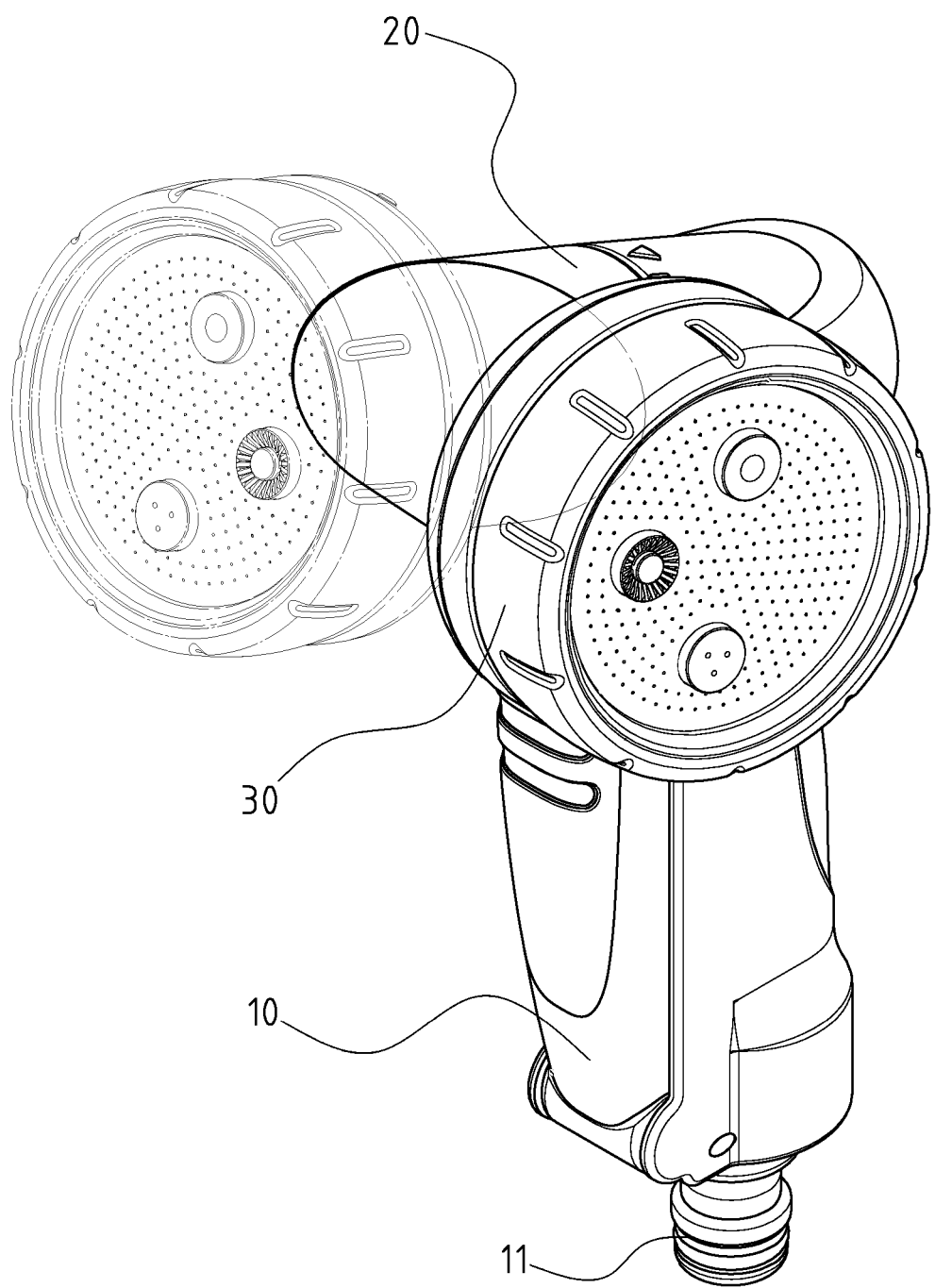
FIG. 11 is a perspective operational view of the sprinkling device in a accordance with the present invention.

The sprinkling head 30 is formed with a second inclined face 31, wherein the second inclined face 31 and an axis of the sprinkling head 30 form a second angle, wherein the second inclined face 31 is elliptical and the second angle is complementary relative to the first angle. The ratio of the major axis and the minor axis of the first inclined face 22 is equal to that of the major axis and the minor axis of the second inclined face 31. Consequently, the first inclined face 22 and the second inclined face 22 are congruent to each other. The first inclined face 22 rotatably abuts the second inclined face 31. The sprinkling head 30 is formed with a sleeve 32 for rotatably receiving the pivot 24 for providing stableness when the sprinkling head 30 is rotated relative to the rotary seat 20. A protrusion 33 extends from the sprinkling heat 30 and moved along the curved groove 25 for limiting the rotating angle between the sprinkling head 30 and the rotary seat 20. As described above, the curved groove 25 is semi-circular such that the rotating angle of the sprinkling head is 180 degrees in every rotating operation. A first dimple 34 and a second dimple 35 are respectively defined in the second inclined face 31, wherein the first dimple 34 and the second dimple 35 are respectively situated on the major axis of the second inclined face 31, and a distance between the rotating axis of the sprinkling head 30 and the first dimple 34 is equal to that between the rotating axis of the sprinkling head 30 and the second dimple 34. With reference to FIG. 7, the steel ball 28 is engaged into the first dimple 34 when the sprinkling head 30 co-axially corresponds to the rotary seat 20. With reference to FIGS. 9 and 10, the steel ball 28 is engaged into the second dimple 35 when an angle is formed between the sprinkling head 30 and the rotary seat 20.

Figure 2:
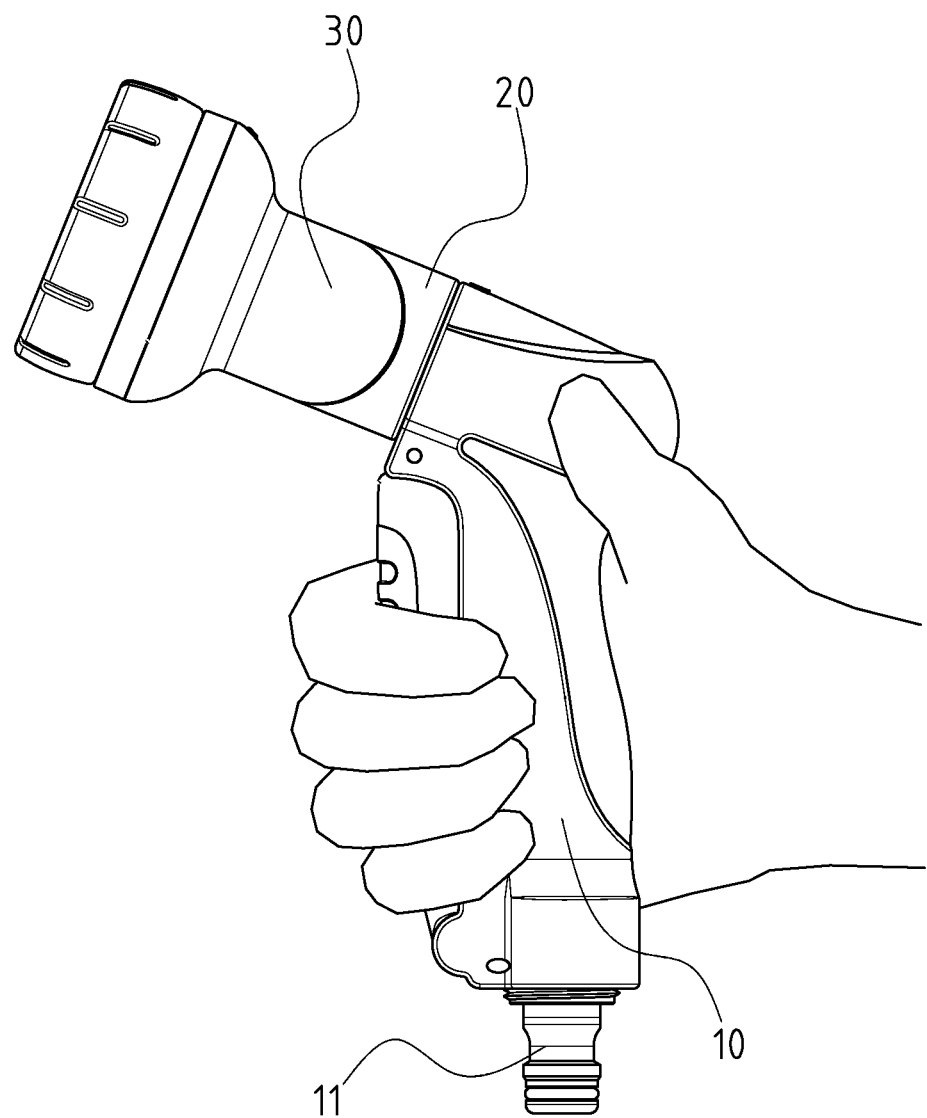
FIG. 2 is a schematic view of the sprinkling device as shown in FIG. 1.
Figure 3:
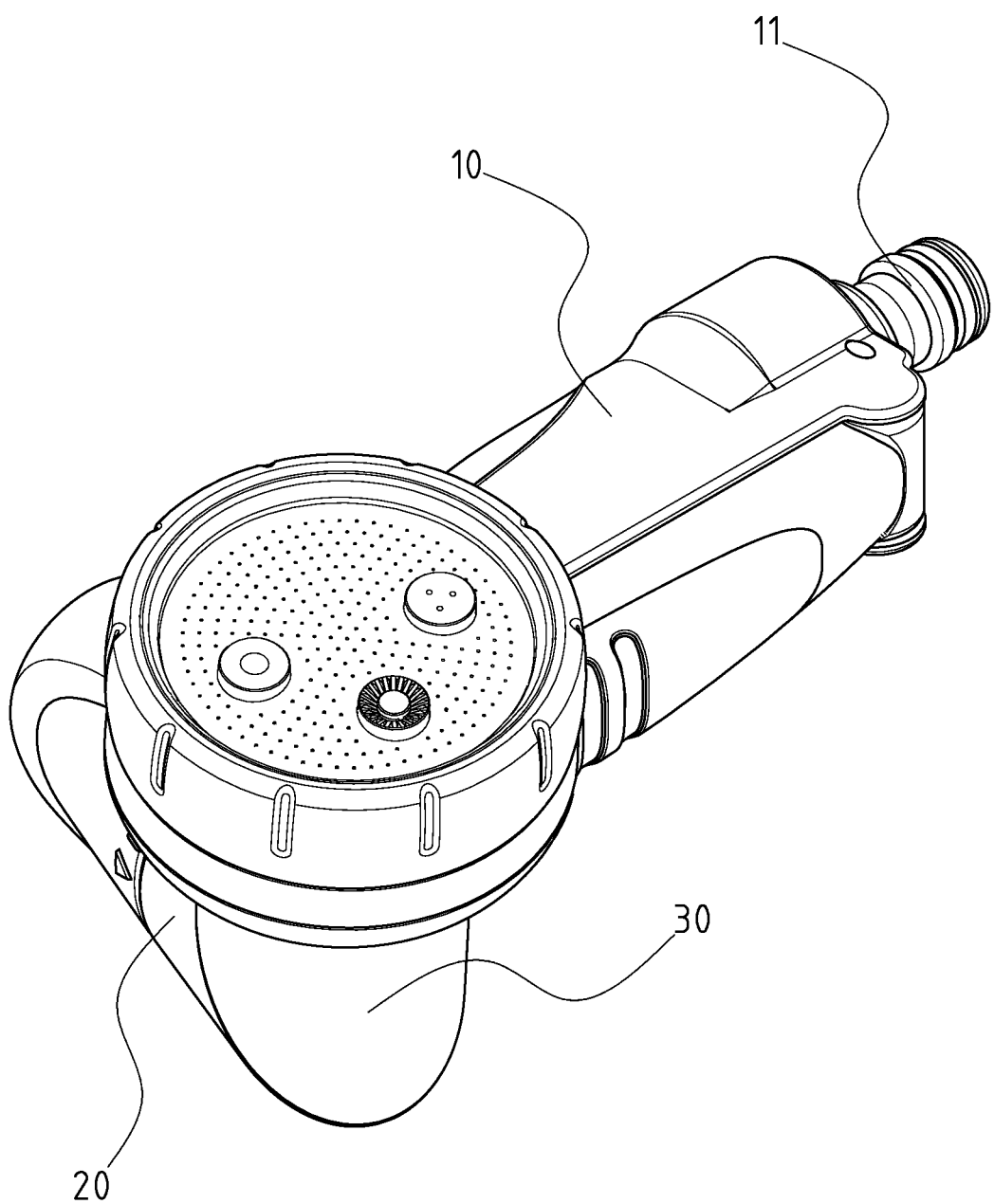
FIG. 3 is a second perspective view of the sprinkling device in accordance with the present invention when being used as a sprinkler.
Figure 4:
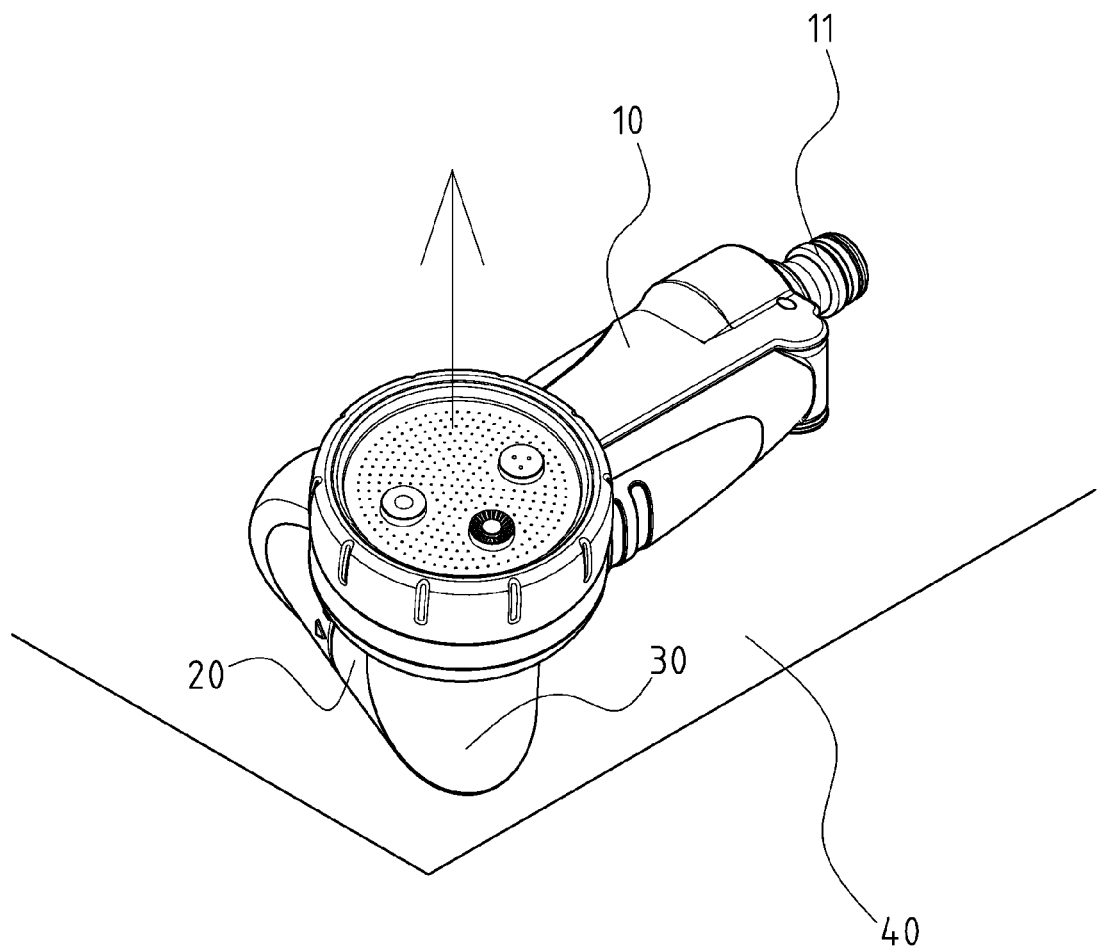
FIG. 4 is a schematic view of the sprinkling device as shown in FIG. 3.
Figure 8:
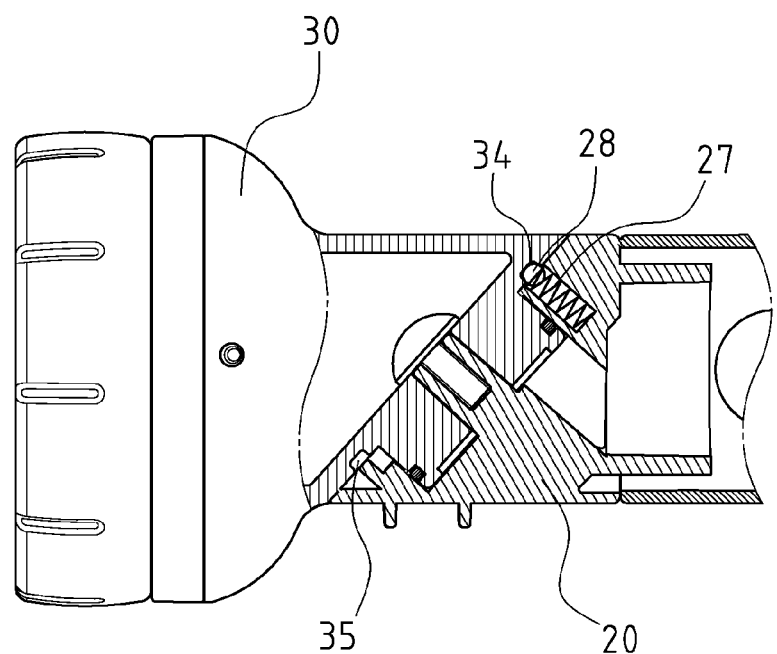
FIG. 8 is a partially cross-sectional view of the sprinkling device in accordance with the present invention.

With reference to FIGS. 1, 2 and 8, the grip 10, the rotary seat 20 and the sprinkling head 30 form a 7-shaped structure and the sprinkling device in accordance with the present invention is used as a spray gun when an axis of sprinkling head 30 co-axially corresponds to that of the rotary seat 20 or the axis of sprinkling head 30 is parallel to that of the rotary seat 20. With reference to FIGS. 3-4 and 9-11, the rotary seat 20 and the sprinkling head 30 form an angle and the sprinkling device in accordance with the present invention is used as a sprinkler when the sprinkling head 30 is rotated relative to the rotary seat 20, the steel ball 28 is moved from the first dimple 35 to the second dimple 35 and the protrusion 33 is moved along the curved groove 25. Then, the operator can use the support structure 29 to support the grip 10, the rotary seat 20 and the sprinkling head 30 on the supporting face 40 and the sprinkling head 30 is upwardly extended for being operated as a sprinkler and continually irrigated a specific area.

As described above, the sprinkling device can be operated as a spray gun as well as a sprinkler for continually irrigating a specific area. In addition, the sprinkling device in accordance with the present invention divided the 7-shaped structure of the conventional spray gun into three parts including the grip 10, the rotary seat 20 and the sprinkling head 30. Consequently, the volume of the mode for molding the grip 10, the rotary seat 20 and the sprinkling head 30 is reduced such that the cost for manufacturing the multi-functional sprinkling device in accordance with the present invention is down.

Although the invention has been explained in relation to its preferred embodiment, it is to be understood that many other possible modifications and variations can be made without departing from the spirit and scope of the invention as hereinafter claimed.

I claim:

1. A sprinkling device comprising:
a grip;
a rotary seat sealingly mounted onto said grip, said rotary seat having a first inclined face formed thereon, wherein the first inclined face is elliptical, the first inclined face and a longitudinal section of said grip forming a first angle; and
a sprinkling head sealingly and rotatably mounted onto said rotary seat, said sprinkling head formed with a second inclined face, wherein the second inclined face and an axis of said sprinkling head form a second angle, the second inclined face is elliptical and the second angle is complementary relative to the first angle, a ratio of a major axis and a minor axis of the first inclined face being equal to that of a major axis and a minor axis of the second inclined face such that the first inclined face and the second inclined face are congruent to each other, wherein, the sprinkling device is a spray gun when an axis of said sprinkling head co-axially corresponds to that of said rotary seat or the axis of said sprinkling head is parallel to the axis of said rotary seat and said rotary seat and said sprinkling head form an angle, the sprinkling device being a sprinkler when said sprinkling head is rotated relative to said rotary seat, said grip and said rotary seat supporting said sprinkling head on a supporting face and said sprinkling head being upwardly extended so as to operate as a sprinkler, wherein one side of said rotary seat is formed with at least one support structure so as to prevent said grip and said rotary seat from being rotated relative to said supporting face.

2. The sprinkling device of claim 1, wherein said grip has a cavity defined in a top portion of said grip and an indentation defined in an inner periphery of the cavity, wherein said rotary seat has an insertion formed on a first end thereof which is inserted into the cavity in said grip and a guider radially formed on the insertion and received in the indentation for ensuring a connecting angle between said grip and said rotary seat.

3. The sprinkling device of claim 2, wherein said rotary seat has a semi-circular groove defined in the first inclined face, said sprinkling head having a protrusion extending therefrom and moved along the semi-circular groove for limiting a rotating angle between said sprinkling head and said rotary seat.

4. The sprinkling device of claim 1, wherein said rotary seat has a bore defined in the first inclined face, a spring and a steel ball sequentially mounted into the bore, a first dimple and a second dimple respectively defined in the second inclined face, wherein the steel ball is engaged into the first dimple when said sprinkling head co-axially corresponds to the rotary seat and is engaged into the second dimple when an angle is formed between the sprinkling head and said rotary seat.

5. The sprinkling device of claim 1, wherein the support structure is multiple ribs extending from said grip.

6. The sprinkling device of claim 1, wherein said rotary seat has a pivot extending from the first inclined face and said sprinkling head is formed with a sleeve for rotatably receiving the pivot.

* * * * *